United States Patent
Chen et al.

(10) Patent No.: US 9,648,314 B2
(45) Date of Patent: May 9, 2017

(54) METHOD OF GLASSES-LESS 3D DISPLAY

(71) Applicants: Laurence Lujun Chen, Hayward, CA (US); Di (Laura) Chen, Xi'an (CN); Jie Guo, Hanying (CN); Michael Meng Chen, Hayward, CA (US)

(72) Inventors: Laurence Lujun Chen, Hayward, CA (US); Di (Laura) Chen, Xi'an (CN); Jie Guo, Hanying (CN); Michael Meng Chen, Hayward, CA (US)

( * ) Notice: Subject to any disclaimer, the term of this patent is extended or adjusted under 35 U.S.C. 154(b) by 377 days.

(21) Appl. No.: 13/987,705

(22) Filed: Aug. 23, 2013

(65) Prior Publication Data
US 2015/0054927 A1    Feb. 26, 2015

(51) Int. Cl.
*H04N 13/04* (2006.01)

(52) U.S. Cl.
CPC ....... *H04N 13/0445* (2013.01); *H04N 13/047* (2013.01); *H04N 13/0413* (2013.01); *H04N 13/0484* (2013.01)

(58) Field of Classification Search
CPC ........... H04N 13/0402; H04N 13/0409; H04N 13/0411; H04N 13/0413; H04N 13/0418; H04N 13/0445; H04N 13/0484; H04N 13/047
See application file for complete search history.

(56) References Cited

U.S. PATENT DOCUMENTS

| | | | | |
|---|---|---|---|---|
| 8,754,829 B2* | 6/2014 | Lapstun | ............ | H04N 13/0402 345/419 |
| 9,507,160 B2* | 11/2016 | Cho | ................... | G02B 27/2214 |
| 2009/0046143 A1* | 2/2009 | Hiddink | ................... | G02B 3/14 348/59 |
| 2010/0060983 A1* | 3/2010 | Wu | .................... | H04N 13/0413 359/466 |
| 2011/0157167 A1* | 6/2011 | Bennett | ..................... | G06F 3/14 345/419 |
| 2011/0157339 A1* | 6/2011 | Bennett | ..................... | G06F 3/14 348/59 |
| 2011/0157697 A1* | 6/2011 | Bennett | ..................... | G06F 3/14 359/462 |
| 2011/0310233 A1* | 12/2011 | Bathiche | ............ | H04N 13/0418 348/51 |
| 2012/0044330 A1* | 2/2012 | Watanabe | .......... | G02B 27/2214 348/54 |
| 2012/0062556 A1* | 3/2012 | Yamamoto | ......... | H04N 13/0022 345/419 |
| 2012/0113510 A1* | 5/2012 | Sato | ................... | G02B 27/2214 359/462 |
| 2012/0162193 A1* | 6/2012 | Bae | .................... | H04N 13/0011 345/419 |
| 2012/0194751 A1* | 8/2012 | Lo | .......................... | B60J 7/1628 349/15 |

(Continued)

*Primary Examiner* — John Villecco

(57) ABSTRACT

Present invention relates to apparatus and methods for glasses-less 3D display with "unlimited" number of TV viewers and with flexibility for eye positions, the fundament elements of this invention are the introduction of "eye space" and the circuit unit for shutter pupil control on shutter screen. The method is t 3D display, such as TV's, monitors, smart devices (iphone, ipad, . . . ), movie theaters, games, etc. The method-includes "mimic scene method" which is based on image depth map and "dynamic pinhole shutter method".

4 Claims, 16 Drawing Sheets

(56) References Cited

U.S. PATENT DOCUMENTS

| | | | | |
|---|---|---|---|---|
| 2012/0243083 A1* | 9/2012 | Takama | G02B 27/2214 | 359/462 |
| 2013/0100175 A1* | 4/2013 | Koito | H04N 13/0409 | 345/690 |
| 2014/0035959 A1* | 2/2014 | Lapstun | H04N 13/0402 | 345/690 |
| 2014/0063015 A1* | 3/2014 | Cho | G02B 27/2214 | 345/426 |
| 2014/0071237 A1* | 3/2014 | Ueki | H04N 13/0014 | 348/43 |
| 2014/0085433 A1* | 3/2014 | Han | H04N 13/0445 | 348/51 |
| 2014/0240809 A1* | 8/2014 | Lapstun | H04N 13/0402 | 359/198.1 |
| 2014/0362314 A1* | 12/2014 | Guo | G02B 27/2214 | 349/15 |
| 2015/0029317 A1* | 1/2015 | Kim | G02B 27/2214 | 348/59 |
| 2015/0222888 A1* | 8/2015 | Kang | H04N 13/0454 | 348/44 |
| 2015/0237331 A1* | 8/2015 | Yen | H04N 13/047 | 348/54 |
| 2016/0014387 A1* | 1/2016 | Baik | G06T 7/97 | 348/51 |
| 2016/0021362 A1* | 1/2016 | Yang | H04N 13/0422 | 348/54 |
| 2016/0021364 A1* | 1/2016 | Liao | H04N 13/0497 | 348/51 |
| 2016/0050404 A1* | 2/2016 | Bruls | H04N 13/0029 | 348/43 |
| 2016/0065953 A1* | 3/2016 | Heo | H04N 13/047 | 348/54 |
| 2016/0091861 A1* | 3/2016 | Liu | H04N 13/0402 | 359/9 |
| 2016/0150223 A1* | 5/2016 | Hwang | H04N 13/0402 | 348/51 |
| 2016/0150226 A1* | 5/2016 | Song | G06T 3/40 | 348/54 |
| 2016/0191904 A1* | 6/2016 | An | H04N 13/0402 | 348/51 |
| 2016/0219268 A1* | 7/2016 | Strom | H04N 13/0484 | |
| 2016/0223827 A1* | 8/2016 | Murao | H04N 13/0409 | |
| 2016/0234487 A1* | 8/2016 | Kroon | G02B 27/2214 | |
| 2016/0255338 A1* | 9/2016 | Song | H04N 13/0029 | 348/47 |
| 2016/0261857 A1* | 9/2016 | Kikuchi | H04N 13/0409 | |
| 2016/0261859 A1* | 9/2016 | Murao | H04N 13/0409 | |
| 2016/0274372 A1* | 9/2016 | Tian | H04N 13/00 | |
| 2016/0291358 A1* | 10/2016 | Kikuchi | G02F 1/1345 | |
| 2016/0295200 A1* | 10/2016 | Bruls | H04N 13/0011 | |
| 2016/0360188 A1* | 12/2016 | Kim | H04N 13/0404 | |
| 2017/0003513 A1* | 1/2017 | Cho | G02B 27/2214 | |
| 2017/0006279 A1* | 1/2017 | Eichenlaub | H04N 13/0404 | |
| 2017/0013253 A1* | 1/2017 | Huber | H04N 13/0447 | |

\* cited by examiner

METHOD OF GLASSES-LESS 3D DISPLAY

CROSS-REFERENCE TO RELATED APPLICATION

The application claims the priority from U.S. provisional application No. 61/744,786, filed on Oct. 4, 2012 with post mail date on Oct. 1, 2012, and tilted "Method of Glasses-less 3D Display".

FIELD OF INVENTION

Present invention relates to apparatus and methods for glasses-less 3D display with "unlimited" number of TV viewers and with flexibility for eye positions, which are applied to any 3D display.

BACKGROUND OF INVENTION

In current glasses-less 3D display systems, the technologies are mainly based on parallax barrier plate, lenticular plate, grating plate, micro-lens array plate (such as IP lens array—integrated photolithography), Fresnel lens, spherical mirror, holographic screen, etc., the numbers of viewers is limited, such as, on 2011 FPD China, showed 3D TV with 9 viewers, Toshiba developed a prototype with only 3 viewers. In FIG. 1 shows glasses-less 3D display principle based on parallax barrier method (with 6 viewers as example). The TV screen is divided into 6 (2 rows, and 3 columns) sub-screens, every screen displays the part of image in it's own area simultaneously, but rotate the display of each sub-screen to each of the 6 viewers, respectively. As one has seen that the positions of viewer's eyes are fixed without flexibility.

SUMMARY OF THE INVENTION

Present invention relates to apparatus and methods for glasses-less 3D display with "unlimited" number of TV viewers and with flexibility for eye positions, the fundament element of this invention is the introduction of "eye space" and the circuit unit for shutter pupil control on shutter screen. The method-is applied to any 3D display, such as TV's, monitors, smart devices (iphone, ipad, . . . ), movie theaters, games, etc. The methods includes "mimic scene method", which is based on image depth map and "dynamic pinhole shutter method".

BRIEF DESCRIPTION OF DRAWINGS

The invention contains for following Figures:

FIG. 15 Shows another example configuration of glasses-less 3D display process and control of this invention, for "dynamic pinhole shutter method", with built-in designs for switch units—address drivers by.

DETAIL DESCRIPTION OF THE INVENTION

In this invention, we proposed two glasses-less 3D display method. The method includes "mimic scene method", which is based on image depth map and "dynamic pinhole shutter method", both of them are based on the concept of "eye space" and the circuit unit for shutter pupil control on shutter screen, and will be described in details below.

<Mimic Scene Method>

Figure 1:
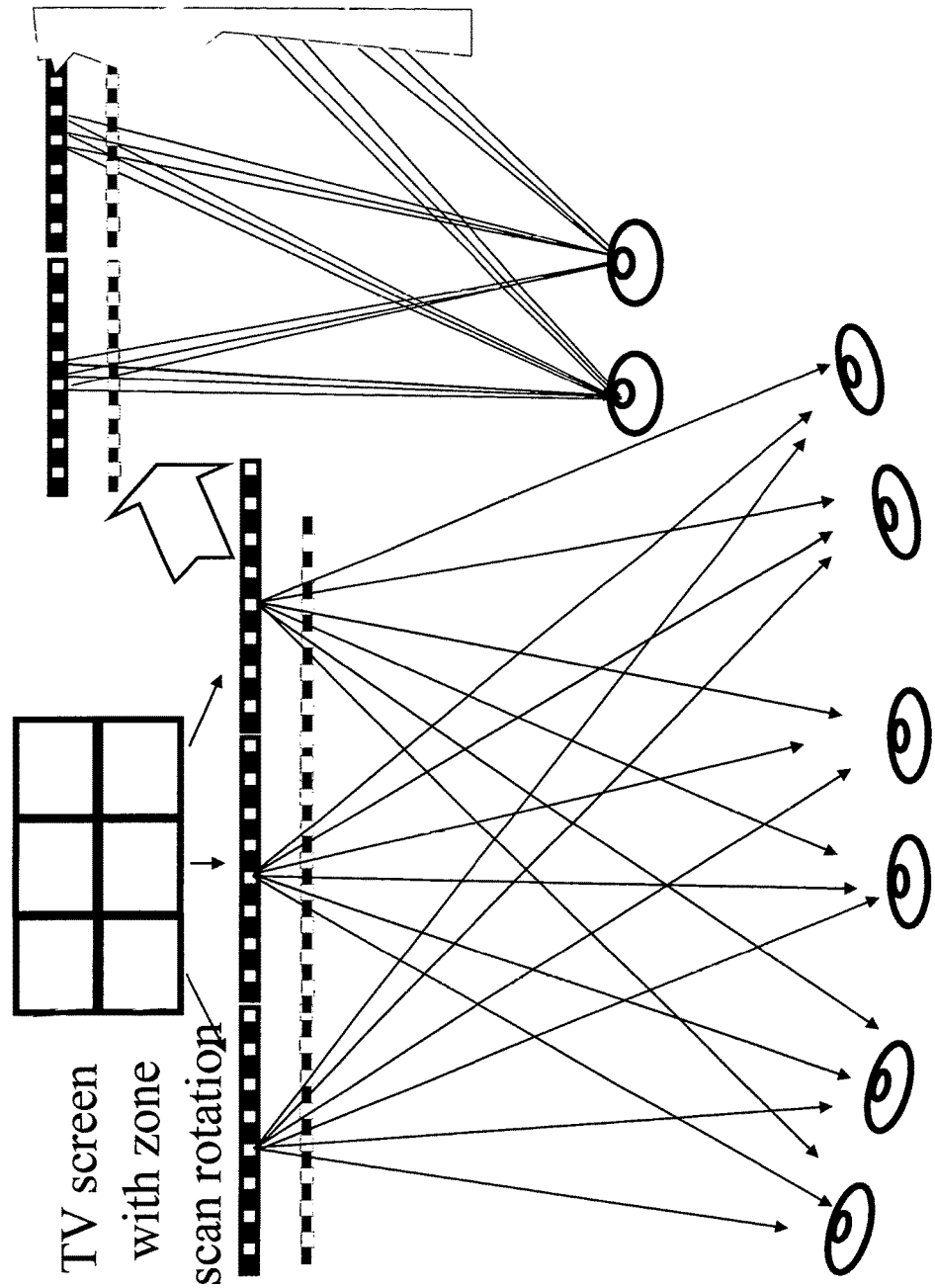
FIG. 1 shows typically prior glasses-less 3D display principle based on parallax barrier method with 6 viewers as example.
Figure 2:
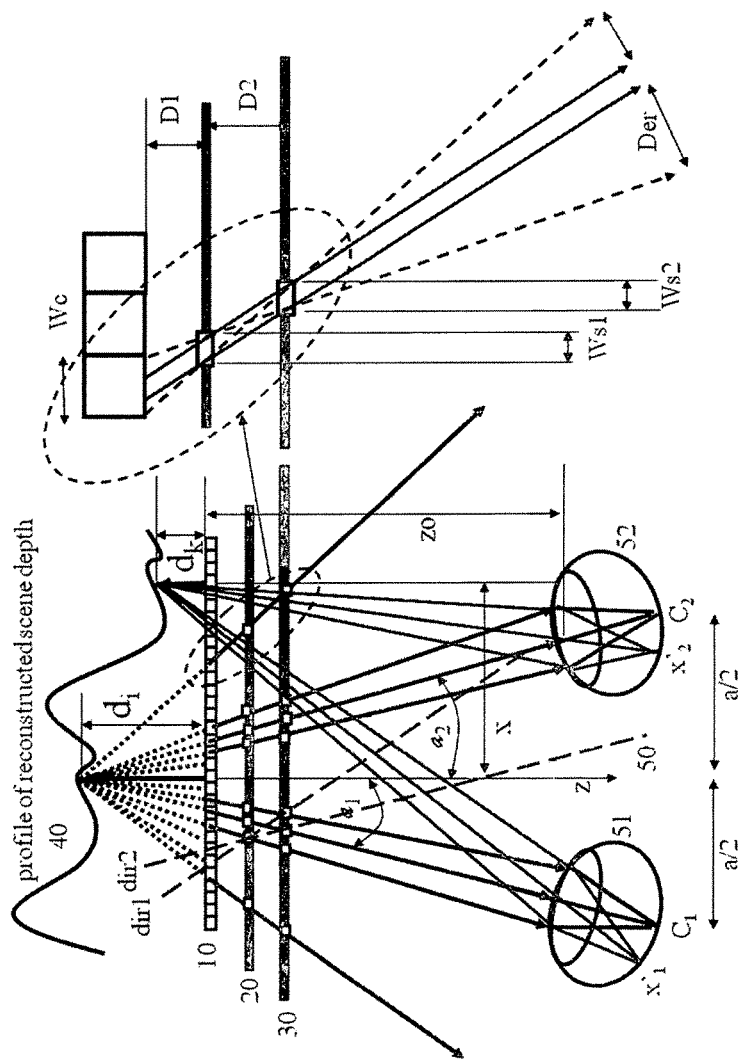
FIG. 2 Display based on "mimic scene method", for the scene point is inside (behind) the screen.
Figure 3:
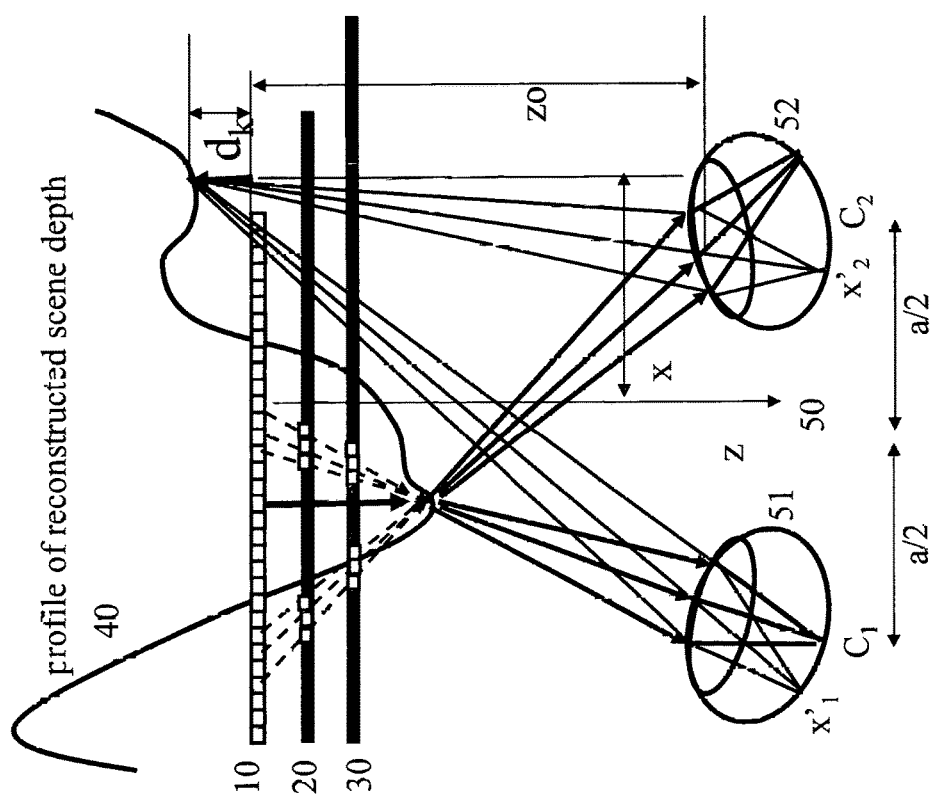
FIG. 3 Display based on "mimic scene method", for the scene point is out of (at front of) the screen.

As shown in FIGS. 2 and 3, in mimic scene method, depth map of scene will be used. FIG. 2 shows the case scene point is inside (behind) the screen; FIG. 3 shows the case scene point is out of (at front of) the screen. Depth map can be (1) obtained by 2D to 3D conversion technology, or (2) reconstructed from FFT correlation analysis of 2 stereo pictures (for left and right eyes), as shown in FIG. 2, or (3) can be obtained by depth map camera (in this case, TV station will send one 2D TV picture with 3 colors and one depth map with one color and save bandwidth from two color data, For 3D TV, generally, we need band width for 2 of 3 colors—total 6 colors for two stereo pictures). For the second case, the first step to do is a matching process, i.e. find out the positions of corresponding points x'1 and x'2 on 2 stereo pictures (detail will be described below), then using camera setup parameters (eye or camera (51, 52) distance a, eye or camera (51, 52) looking directions a1=a2, camera focus length f), to construct the image depth z=zo+dk by using the following formula $$x'_1 = f \frac{\cos\alpha_1 - \frac{z}{x+a/2}\sin\alpha_1}{\frac{z}{x+a/2}\cos\alpha_1 + \sin\alpha_1} \quad (1)$$

$$x'_2 = f \frac{\cos\alpha_2 - \frac{z}{x-a/2}\sin\alpha_2}{\frac{z}{x-a/2}\cos\alpha_2 + \sin\alpha_2} \quad (2)$$

$$y'_1 = y'_2 = -y\frac{f}{z} \quad (3)$$

Solving equations (1) to (3), we get $$z = a \cdot \left[ \frac{x'_1 \cos\alpha_1 + f\sin\alpha_1}{-x'_1 \sin\alpha_1 + f\cos\alpha_1} - \frac{x'_2 \cos\alpha_2 - f\sin\alpha_2}{x'_2 \sin\alpha_2 + f\cos\alpha_2} \right]^{-1} \quad (4)$$

$$x = z \cdot \frac{x'_2 \cos\alpha_2 - f\sin\alpha_2}{x'_2 \sin\alpha_2 + f\cos\alpha_2} + \frac{a}{2} \quad (5)$$

$$y = -y'_2 \frac{z}{f} \quad (6)$$

Figure 4:
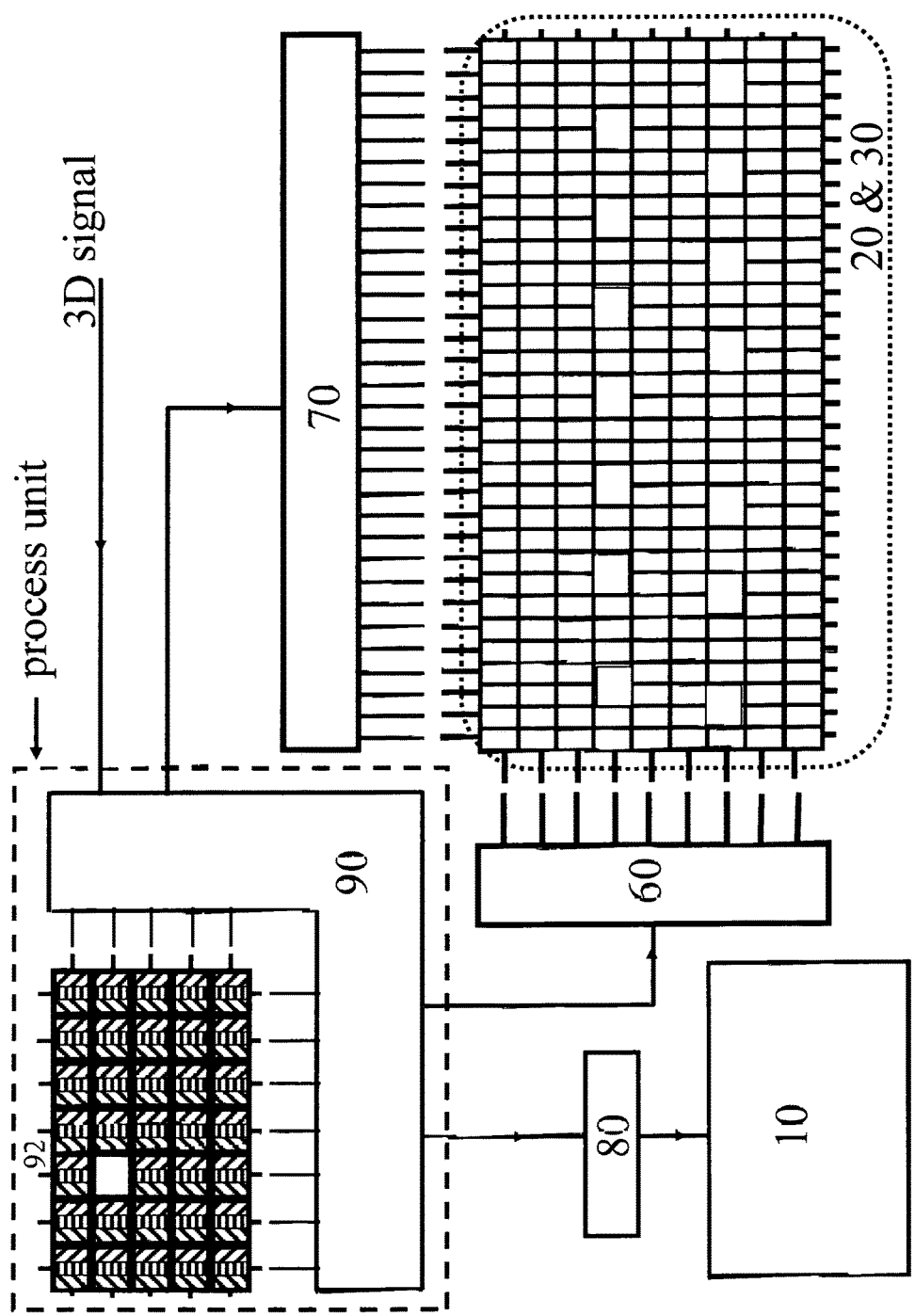
FIG. 4 Shows an example configuration of glasses-less 3D display process and control of this invention, for "mimic scene method".

For easier understand, let us consider an imaged "Picture Space" (PS) 92, as shown in FIG. 4, which contains same size (N1×N2) of pixel matrix as that of any one of the two stereo pictures, and there is one to one location correspondence of a virtual pixel on PS and a pixel on any one of the two stereo pictures. For each given virtual pixel at location (i, j) on PS [i.e. at the i-th row and the j-th column, then x=j, and y=i)], to find out the positions of corresponding points (x'1, y'1) and (x'2, y'2) on two stereo pictures, we need to use a (n1×n2) sub-matrix of pixels around the pixel (i, j) on each of the two stereo pictures [i.e. center at location (x, y), n1 and n2 must be large enough, but need to satisfy n1<<N1 and n2<<N2], and apply FFT correlation analysis on these two sub-matrixes, the image shift amount (dX, dY) between the two sub-matrixes can be obtained, then as first order approximation, x'1=x+dX/2, x'2=x−dX/2, and y'1=y+dY/2, y'2=y−dY/2, and then z can be calculated from equation (4) above. If necessary, we can do iteration calculation to make correction for (x'1, y'1), (x'2, y'2) and z, i.e. by solving x'2 and y'2 from equations (5) and (6) for given z, and mixing old (x'2, y'2) with new (x'2, y'2) with proper weights, then corrected (x'2, y'2) can be obtained, which leads to corrected (x'1, y'1) by using x'1=x'2+dX and y'1=y'2+dY. Finally, put the corrected (x'1, y'1) and (x'2, y'2) back into equation (4) to get corrected z, and so on until the difference between new and old values are small enough. A special treatment [using multiple dividend (such as ¼, ¹⁄₁₆, ¹⁄₆₄, . . . ) sub-pictures for FFT correlation analysis] is needed when there is a large area with uniform background in the two stereo pictures.

Figure 5:
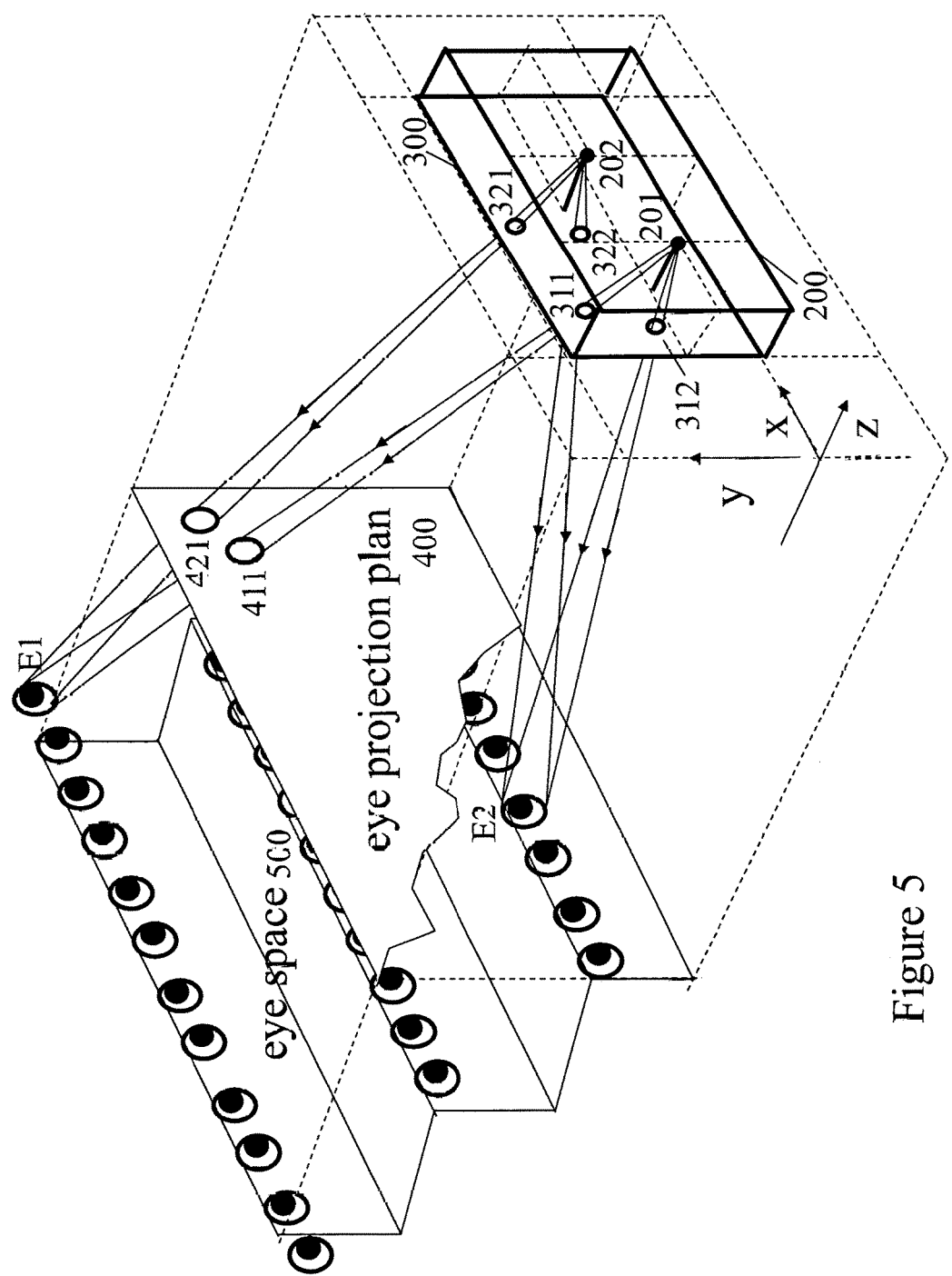
FIG. 5—Shows example of eye space and the relation to display and shutter screens.

Once display process unit 90 (in FIG. 4) receives signals of the left eye and right eye pictures (or of one picture with depth map), process unit uses any method such as mentioned above to get the depth profile 40 (need using more complex technology to deal with missing part problem), then display process unit 90 calculates the pixel positions in a pixel string (for each ray to each eye in eye space is corresponding to a pixel string, a pixel string for a ray to given eye consists of 3 pixels aligned on a line along the ray, one pixel of the 3 pixels (lighting pixel) is on lighting screen 10, the 2nd pixel of the 3 pixels (inner shutter pixel), is on inner shutter 20 and the 3rd pixel (outer shutter pixel), is on outer shutter 30), and process unit 90 prepares the address of these pixels to switch on, and finally process unit 90 organizes all these information into display streams and sends them to buffers 60, 70, 80 for temporary storage (ready to release for display once trigger signal is received). The display streams include 3 streams, i.e. stream for lighting screen 10, for inner direction shutters 20 and for outer direction shutters 30, respectively. Pixel (with colors and brightness) on lighting screen 10 and pixels on direction shutters 20 and 30 are switched on and off synchronously for given direction or given ray. The virtual pixel on PS is distinguished form the pixel on display lighting screen 10 and shutter screens 20 and 30. Each virtual pixel on PS has one to one correspondence with art "object" on the depth profile 40, with same color and brightness as this "object" which "radiates" rays to all directions or to all eyes in eye space [eye space for Dynamic Pinhole Shutter Method is shown in FIG. 5, the eye space for Mimic Scene Method is similar to that in FIG. 5, but not exactly same. For Mimic Scene Method, we don't need to distinguish left eye or right eye in eye space, and eye density can be much higher than Dynamic Pinhole Shutter Method]. So, each virtual pixel on PS includes information (dk, R, B, G, I), where dk is scene depth, (R, B, G) are the color and I (by TV setup) is brightness value for this virtual pixel, and the position, color and brightness of pixel on lighting screen 10 are determined by signal of "virtual pixel" on PS. The density of virtual pixel on "Picture Space" is same of that for regular 2D display or conventional 3D display. However, the pixel density on lighting screen 10 and shutters 20 and 30 are determined by the eye density in eye space and should be much higher than that on PS Regarding the lighting screen 10 and shutters 20 and 30, as shown in FIGS. 2 and 3, they can consist of (1) a whole matrix filled with pixels or (2) a whole matrix filled with vertical lines (or strips), or (3) segmented matrixes filled with pixels or (4) segmented matrixes filled with vertical strips, the "segmented" can be considered as sub-screens.

In cases (1) and (2), for each "object" on the depth profile 40 (i.e. each virtual pixel in PS), strips are scanned one by one from left to right, or pixels are scanned one by one from left to right and from top to bottom—when scan passing over, all the pixels or strips on whole lighting screen 10 are lighting same color with same brightness as that of the "object" (uniform color and brightness over all whole screen, but only scanning over, not lighting simultaneously).

In cases (3) and (4), i.e. case of sub-screens, for each "object" on the depth profile 40, do the same as above, i.e. strips are scanned one by one from left to right, or pixels are scanned one by one from left to right and from top to bottom—when scan passing over, but all the pixels or strips on each sub-screen (not whole careen) in lighting screen 10 are lighting same color with same brightness as that of the "object" (uniform color and brightness over each sub-screen), and there are two choices: (a) in all sub-screens, strips or pixels are scanned simultaneously, because the corresponding strips or pixels (when switched on) in two neighboring sub-screens have constant separation, the separation (i.e. size of sub-screen) must be large enough, so as to avoid the wrong rays as shown by the long dash lines dir1 and dir2 in FIG. 2; (b) not scan in each sub-screen, but just switch on or off simultaneously all strips or pixels in the sub-screen, and any two neighboring sub-screens are not lighting on at same time, but are lighting on/off alternatively to avoid the wrong rays mentioned above.

PS can be also divided into multiple sub-screens. The During real time playing of 3D display, the each of "virtual pixels" on PS is scanned row by row (horizontally scan), or scanned column by column (vertically scan), and is scanned in whole screen of PS or in each of independent sub-screen.

In the following example, we assume using row by row scan. "A virtual pixel on PS is switch on" means triggering on simultaneously all the 3 pixels in the pixel string of the first ray in the first row (the 3 pixels are on lighting screen 10 and on shutters 20 and 30, respectively), and then triggering on all the 3 pixels in the string of the 2nd ray in the first row, and so on to last ray in the first row, . . . and to the 2nd row and 3rd row, . . . , and finally to the last row, then continue on next pixel on PS, and so on . . . .

In summary, either lighting screen 10 (with shutter screens 20 and 30 together), or PS or both of them can be divided into multiple sub-screens (multiple zones), the scan mentioned above can be applied to each zone simultaneously, so as to meet the requirement for high speed process, to increase the brightness for same other conditions, and to avoid the wrong rays mentioned above.

The rays cannot be infinitely dense. The maximum allowed divergent angle can be defined, such as, one tenth of a/z for example, which determines Der and the designs for Ws1, Ws2, D1, and D2 as shown in FIG. 2.

<Dynamic Pinhole Shutter Method>

All Figures from 5 to 16 are used for illustrating dynamic pinhole shutter method. Some terminologies should be introduced below for convenient description:

1. eye space 500—in dynamic pinhole shutter method, it means any possible (left and right) eye pair locations, eye pairs can be up to 1360 for 70" TV in a family room, and up to 5000 for theater, so it can provide service for unlimited viewers [However, in mimic scene method, it means any possible eye (not eye pair—no distinguish for left and right eyes) locations, eye can be up to 10,000 for 70" TV, and up to 40,000 for theater, actually, there is no limitation for number of eyes as long as the control circuit is achievable]
2. eye projection plan 400
3. shutter screen 300, on which shutter windows (or shutter pupils) has correspondence to the eye pattern on eye projection plan 400
4. pinhole plan 200
5. image pixel screen 100, an image pixel consists of 3 or 4 color pixels
6. lighting—means that light valve is switch on and pass back light (if the pixel is a passive light source, such as back LED lighting in LCD display), or means emitting light if the pixel is an active light source (such as plasma display.
7. shutter/valve pixel—minimum physical light valve on shutter screen 300
8. shutter pupil may contain 1 or 2 or 3 or more shutter pixels or valve pixels
9. shutter pupil row-address driver 600, which may or may not include a row address matrix
10. shutter pupil column-address driver 700, which may or may not include a column address matrix Important statement: different people may use different names for the same items or same concepts defined by these terminologies in this invention. Various changes, modifications, alterations, decorations, and extensions in the structures, embodiments, apparatuses, algorithms, procedures of operation and methods of data processing of this invention will be apparent to those skilled in this art without departing from the scope and spirit of the invention. Although the invention has been described in connection with specific preferred embodiments, apparatuses, numbers, it should be understood that the invention as claimed should not be unduly limited to such specific embodiments and apparatuses As shown in FIG. 5, any one of the pixel on image pixel plan 100 (not shown, but shown in FIG. 10 later) has many light (or beams) connections to each eye in eye space 500, a beam from a pixel on image pixel plan 100 (at a given moment) passes through a pinhole (such as 201, and 202, etc, it is an imaged, not materialized) on pinhole plan 200, and passes through pupils (such as 311 etc) on shutter plan 300, and then passes through imaged apertures (such as 411, etc) on eye projection plan 400, and finally reaches to the corresponding eye in eye space 500. Apertures on eye projection plan 400 and shutter pupils on shutter plan 300 have one to one correspondence, either for locations or for sizes.

Figure 6:
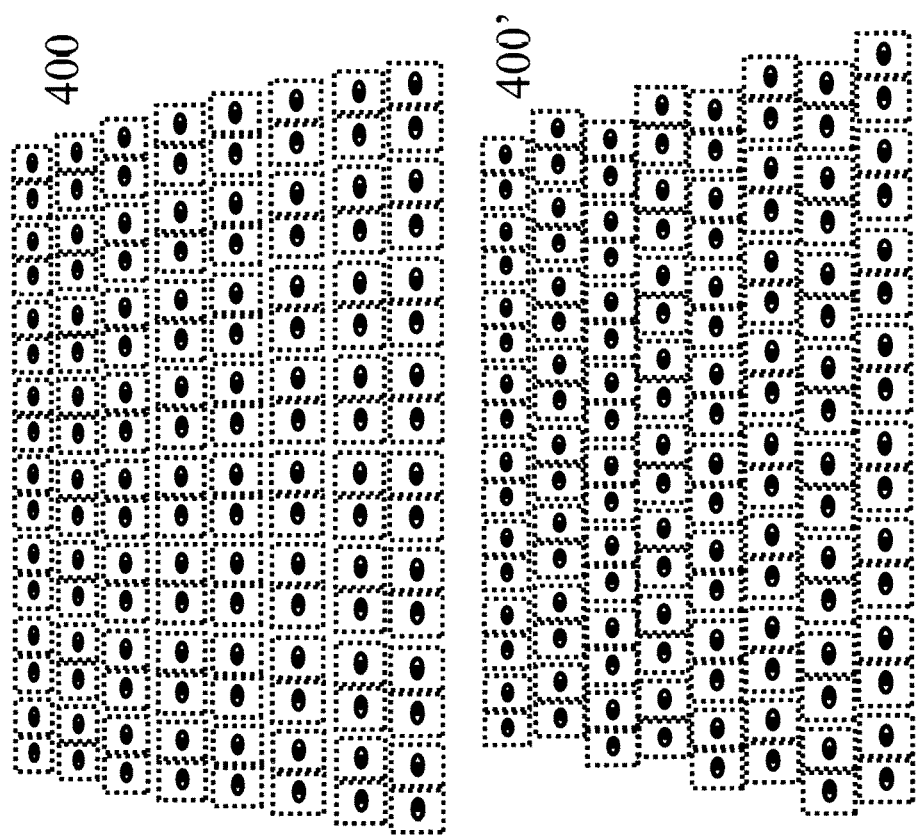
FIG. 6 Shows two examples of eye space and eye tolerant ranges.
Figure 7:
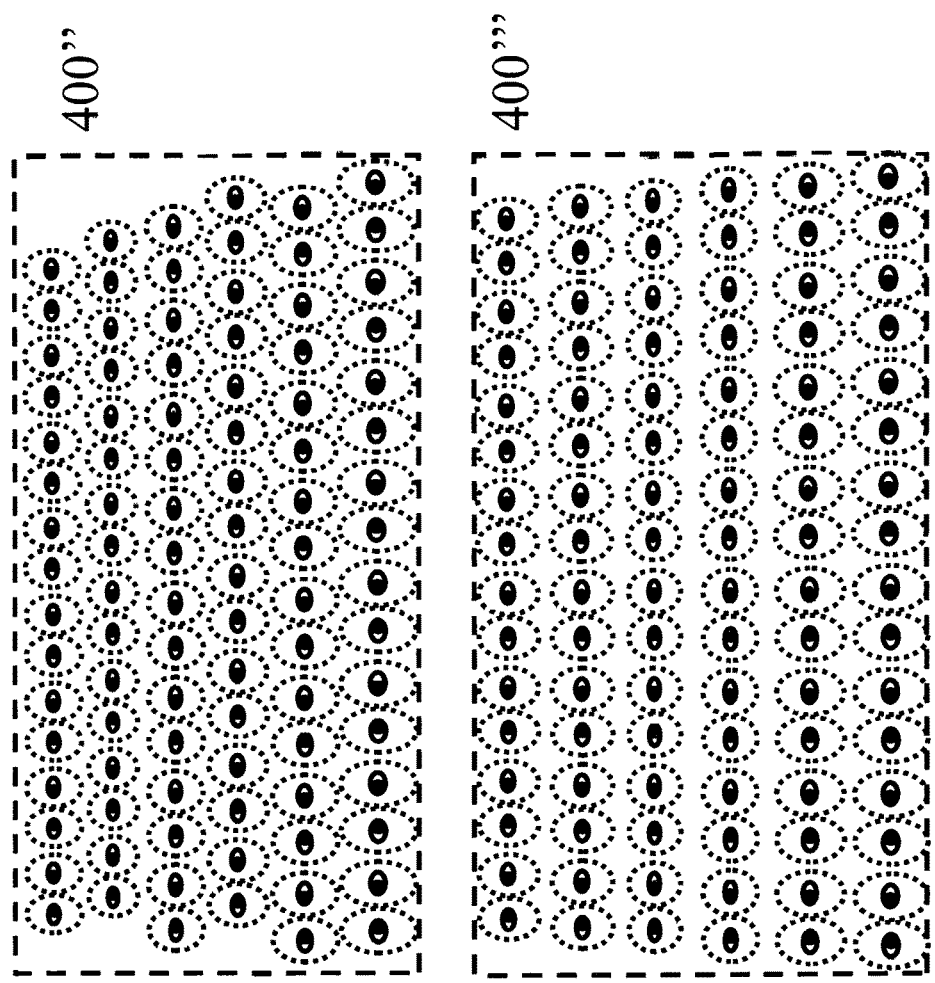
FIG. 7 Shows another two examples of eye space and eye tolerant ranges.
Figure 8:
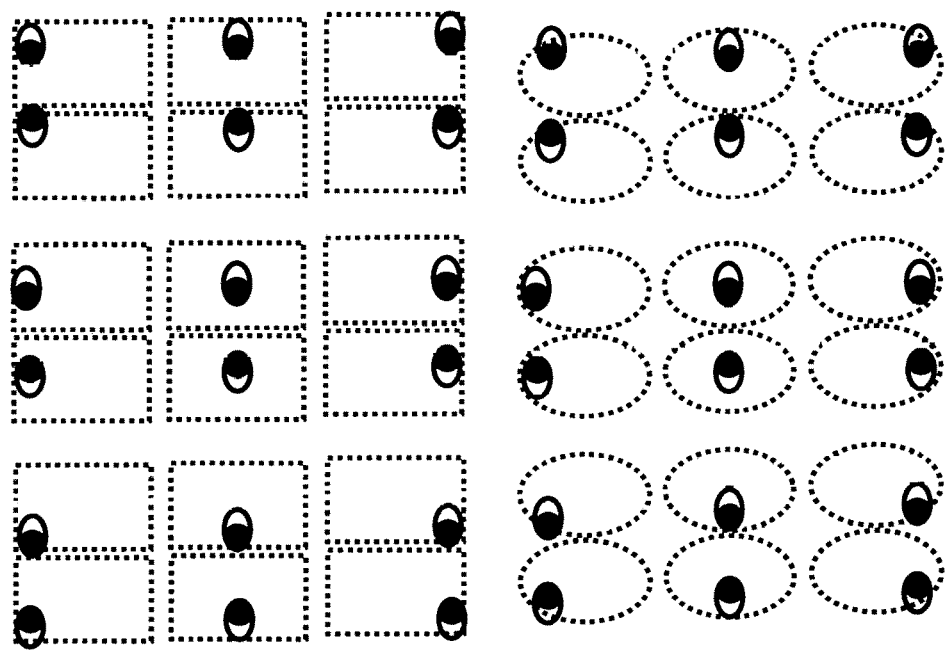
FIG. 8 Shows eye tolerant ranges at different locations.
Figure 9:
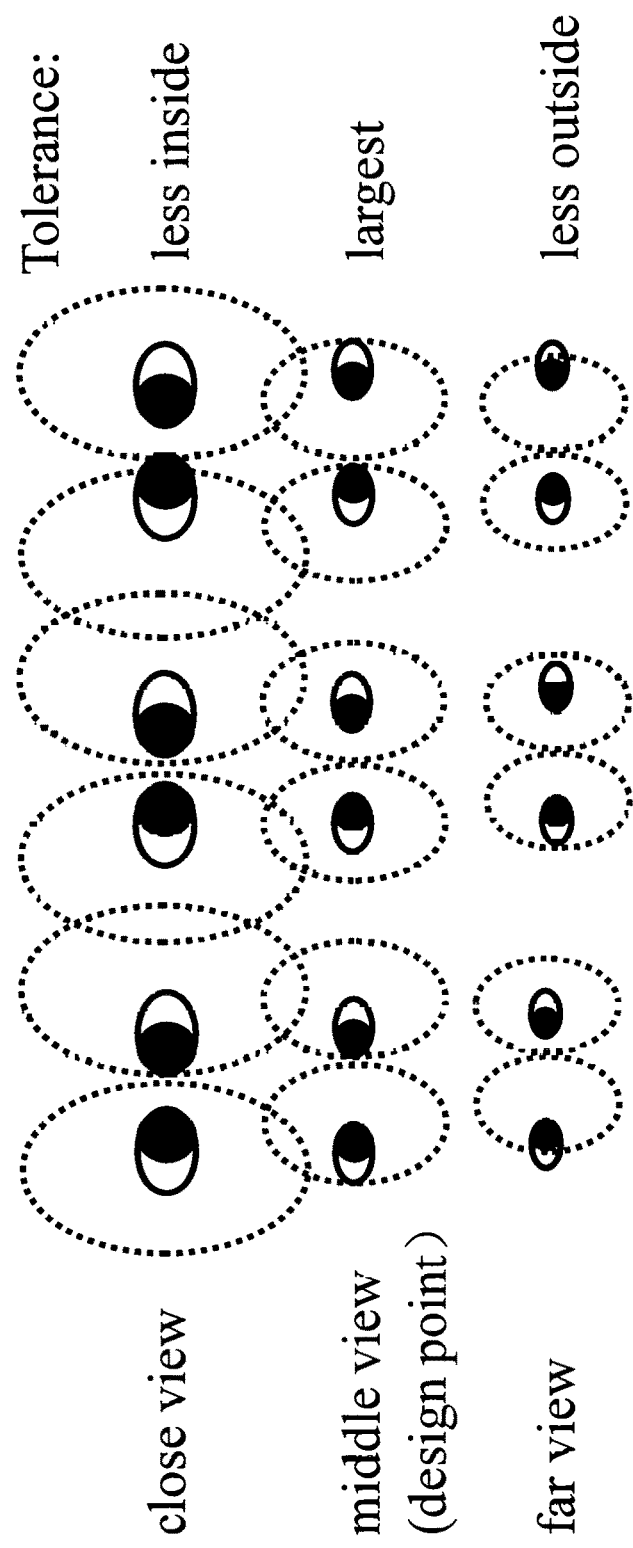
FIG. 9 Shows eye tolerant ranges at different view depth.

FIGS. 6 and 7 show the allowable size or range and visible zones of the apertures on eye projection plan 400. The eyes far away have smaller but denser apertures. FIG. 8 shows the tolerant range for eye or head movement without changing viewer's location or posture, and even without jumping to next zone. Therefore, it can be seen in FIG. 9 that, a closer viewer has more tolerance at outside, but less tolerance at inside, while a far viewer has more tolerance at inside, but less tolerance at outside.

Figure 10:
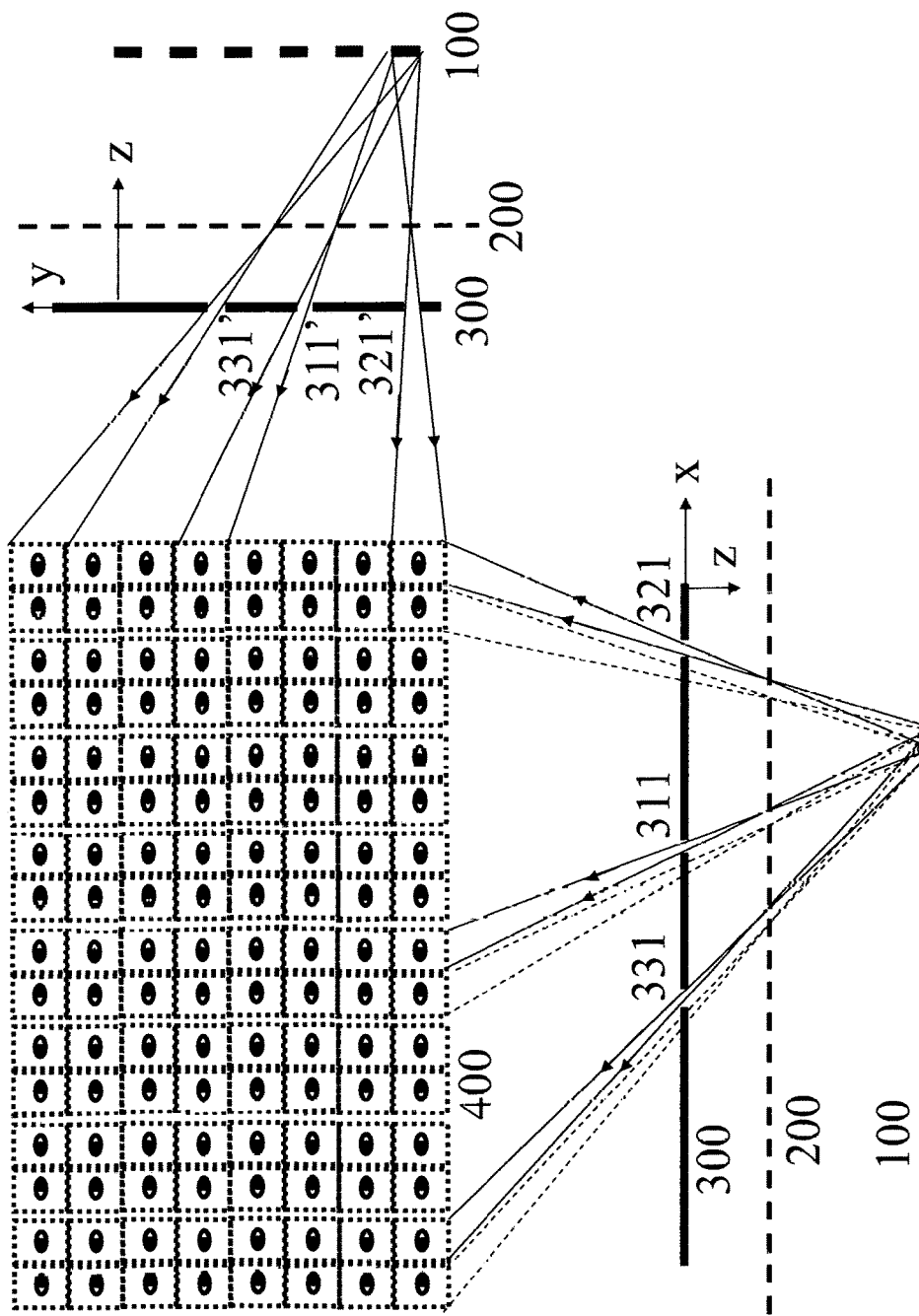
FIG. 10 Shows how to determine the pupil's locations and sizes on shutter screen for all right eyes.
Figure 11:
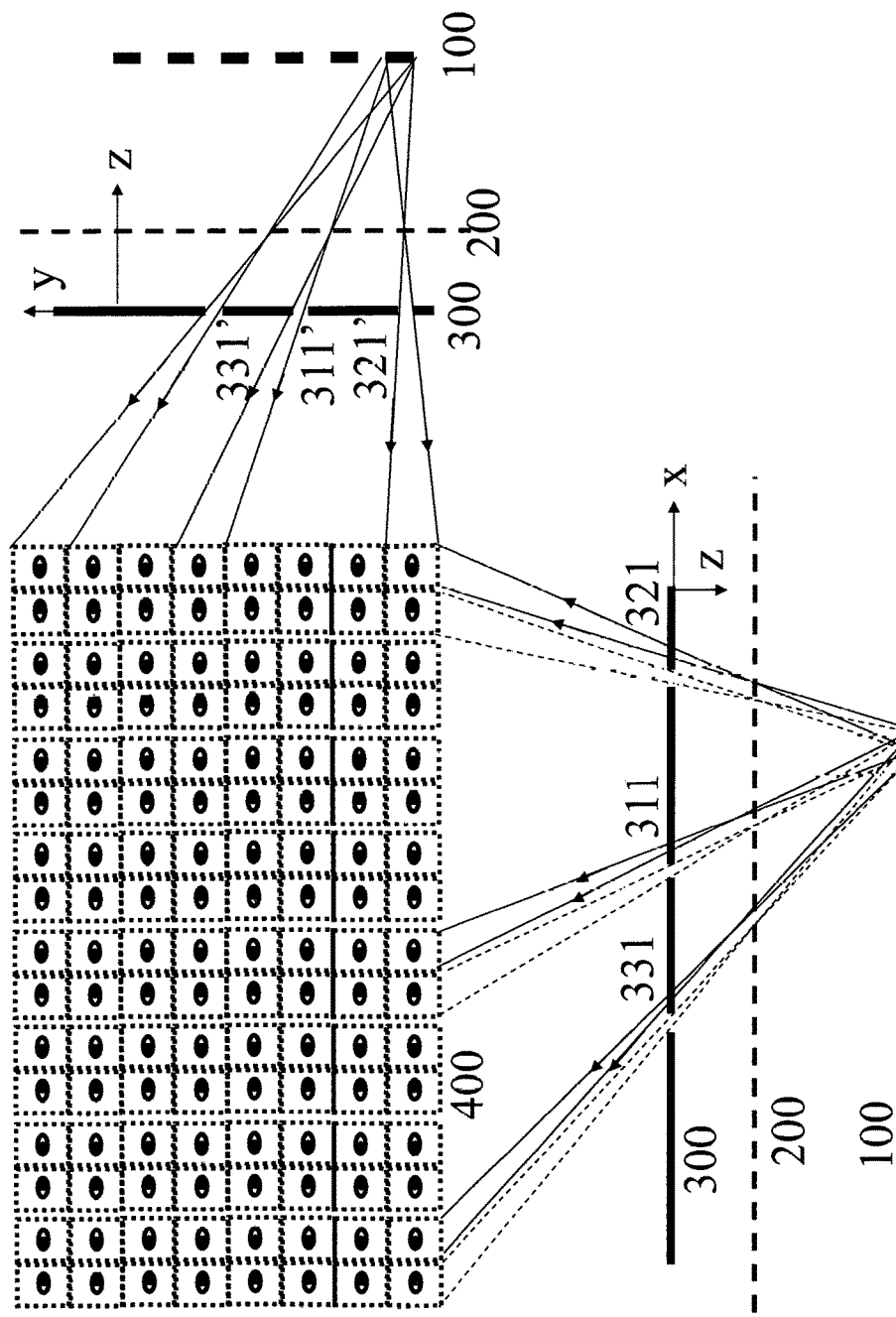
FIG. 11 Shows how to determine the pupil's locations and sizes on shutter screen for all left eyes.

FIG. 10 shows how to determine the pupil's locations and sizes on shutter screen 300 for all right eyes, and FIG. 11 shows the pupil locations and sizes for all left eyes, such as the row locations 311', 321', 331' etc, and column locations in each row, such as 311, 321, and 331 etc.

Figure 12:
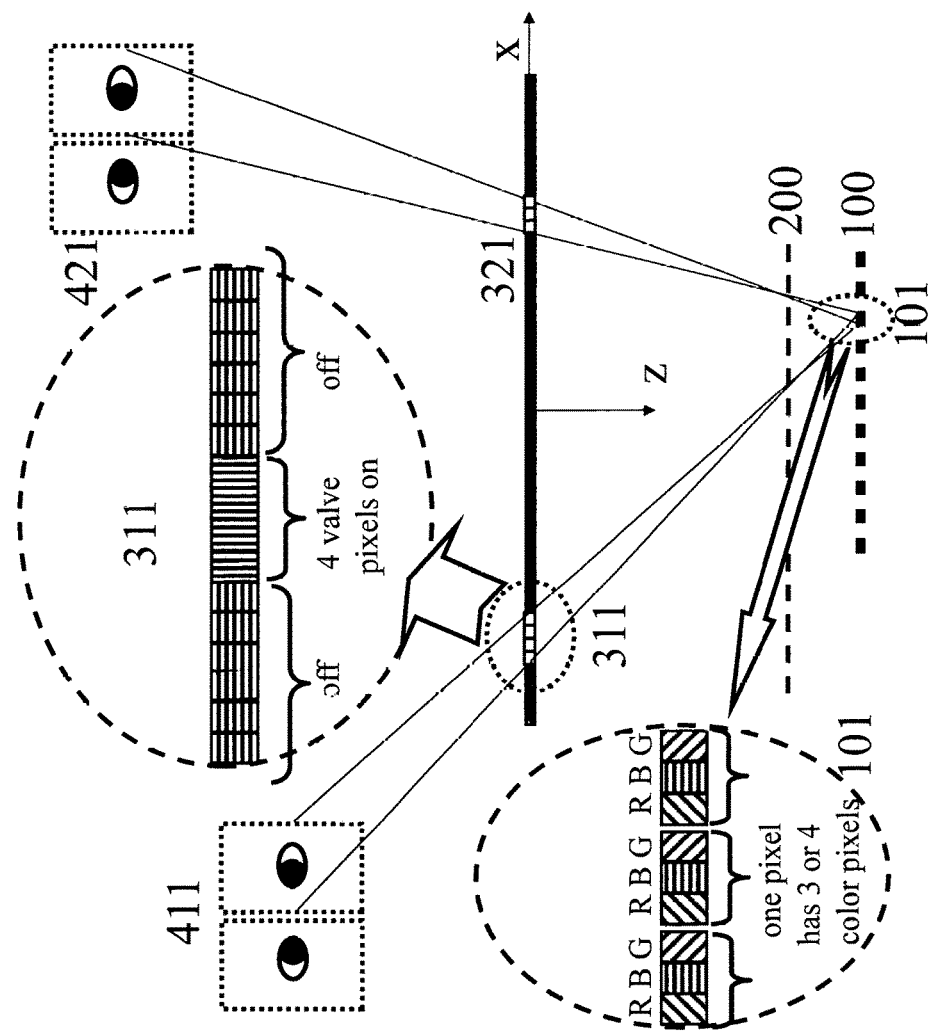
FIG. 12 Shows zoom-in view for image pixels on the image pixel plan and shutter pupils and shutter pixels on shutter plan.

FIG. 12 shows zoom-in view for image pixels on the image pixel plan 100 and shutter pupils and shutter pixels on shutter plan 300. One image pixel consists of 3 or 4 color pixels, such as R, B, G (or Red, Green, Blue with one more different color if needed), and R, B, G can be in horizontal configuration as shown in FIG. 12 (as used in current TV), or in vertical configuration (not shown in Figures, but it is first option of this invention). One shutter pupil may contain 1 or 2 or 3 or more shutter pixels or valve pixels. Smaller valve pixels in a pupil (need more valve pixels for given pupil size) are better for size and location control, as long as not too small due to too high cost or due to light diffraction effect for red color becoming important. Pupil's size and density have distribution over the shutter plan 300.

Image pixels can be manufactured by any technologies, such as liquid crystal display (LCD) based, including regular or conventional LCD, TET-LCD (thin film transistors), or organic light emission diodes (OLED), or surface-conduction electron-emitter display (SED), or plasma, field emission display (FED), etc, or any other technologies which have not been invented yet.

The front polarizer of the LCD based can be dropped, if the valves pixels on shutter screen 300 are polarizing light based.

Figure 13:
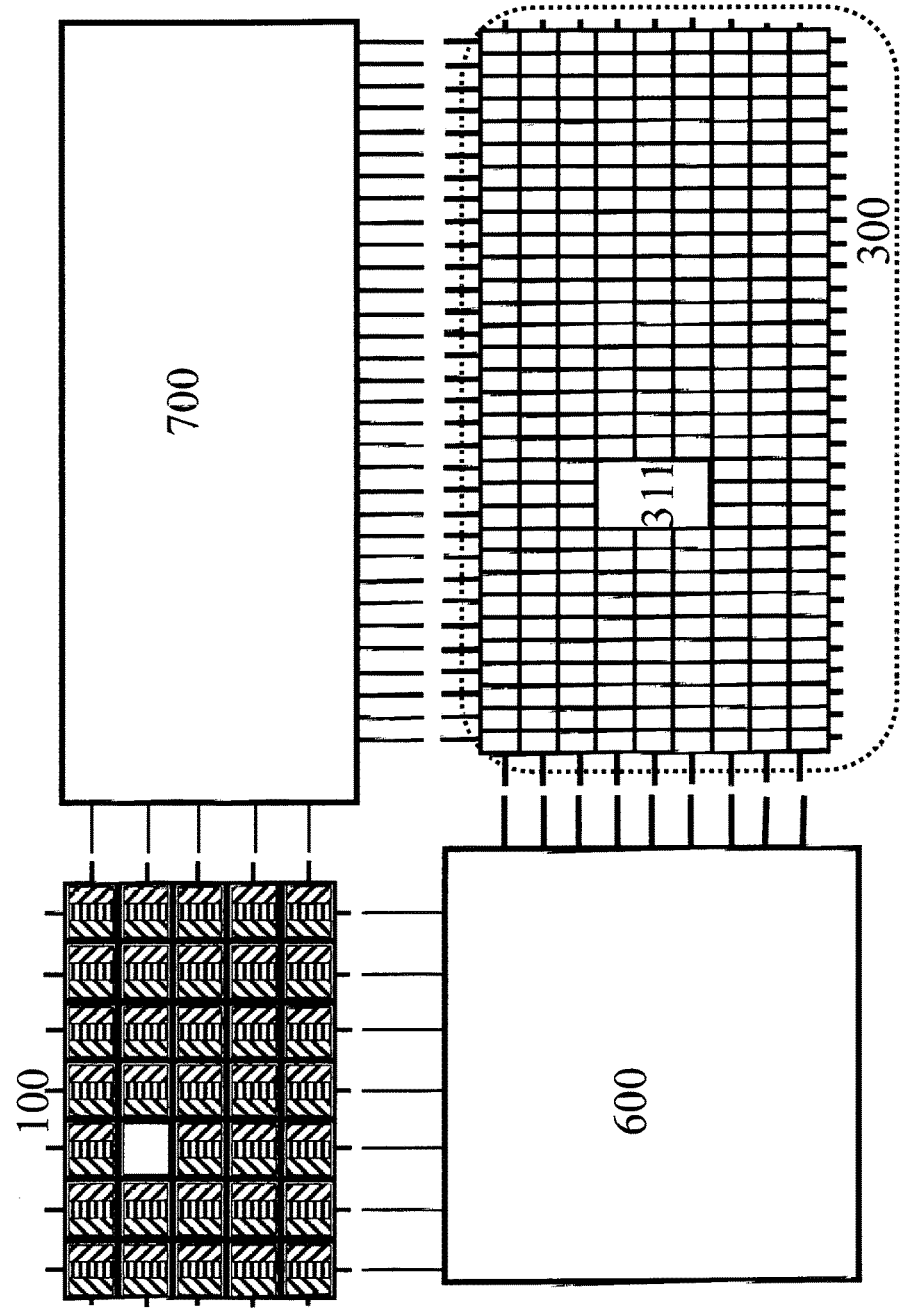
FIG. 13 Shows a configuration of glasses-less 3D display process and control of this invention, for both methods.

On image pixel screen 100, the image pixel scanning procedures can be same as convention 3D display with glass, or scanning with multiple zones [within each zone, scan the images which belongs to this zone, and rotating the display in each zone to different viewers, but all the zones are scanned simultaneously]. During the scanning, when an image pixel is selected, i.e. the pixel is lighting, all color pixels in this image pixel can be lighting simultaneously, or lighting in series outer. Whatever which method for lighting image pixel is used, as shown in FIG. 13, when an image pixel on image pixel screen 100 for right eye picture is lighting, all the corresponding pupils (for all right eyes) on shutter plan 300 will be switched on simultaneously (i.e. all valve pixels in each of these pupils for right eyes should pass light), which is controlled by the row address drivers 600 and column address driver 700; similarly, when an image pixel on image pixel screen 100 for left eye picture is lighting, the corresponding pupils (for all left eyes) on shutter plan 300 will be switched on simultaneously (i.e. all valve pixels in each of these pupils for left eyes should pass light). If without eye-tracking system, the address (i.e. location) matrix of pupils for all right eyes and address matrix of pupils for all left eyes are pre-determined in circuit design (i.e. built-in in address drivers 600 and 700). If with eye-tracking system (camera and process units), these address matrixes are dynamically calculated and dynamically controlled by address drivers 600 and 700 according to the data from eye-tracking system or calculated by process units of eye-tracking system.

In eye space, from bottom to top, the eye to screen distance is increasing and so the apertures size on eye projection plan 400 is decreasing and the eye density should also be increasing correspondingly. However, gradually increasing in density or decreasing the apertures size from bottom to top is very hard for the development of control circuits, so we could use multiple zones (2, or 3, . . . ) with different densities from bottom to top, but in each zone, the density and apertures sire are uniform. Therefore, for each zone, we need one group of address control matrixes (circuits), and so need n groups of address matrix for n zones (n=1, 2, 3, . . . ). We also need total 3~4 address matrixes in each group—2 row address matrixes and 1 or 2 column address matrixes, the former being built-in address drivers 600 or being calculated by address drivers 600 or by process units mentioned above, one for all right eyes, and one for all left eyes; and the latter being built-in address drivers 700 or being calculated by address drivers 700 or by process units mentioned above, for either of (or both of) all right eyes and all left eyes. Usually, we only have one group of address matrixes (only one zone). However, if we build or design 2 or 3 Or more groups of address matrixes for 2 or 3 or more zones in eye space (with little overlap between neighboring zones), so as to increase the total eye depth (distance from an eye at the nearest to an eye at the most distant relative to screen) in eye space, or to increase the eye-motion tolerance [because, for given total eye depth in eye space, the eye depth in each of zone1, and zone 2, . . . (corresponding group 1, group2, . . . respectively) in eye space is reduced]. The screen 100 in all FIGS. 13-16 is a part of the full screen after anti-clock rotation.

Figure 14:
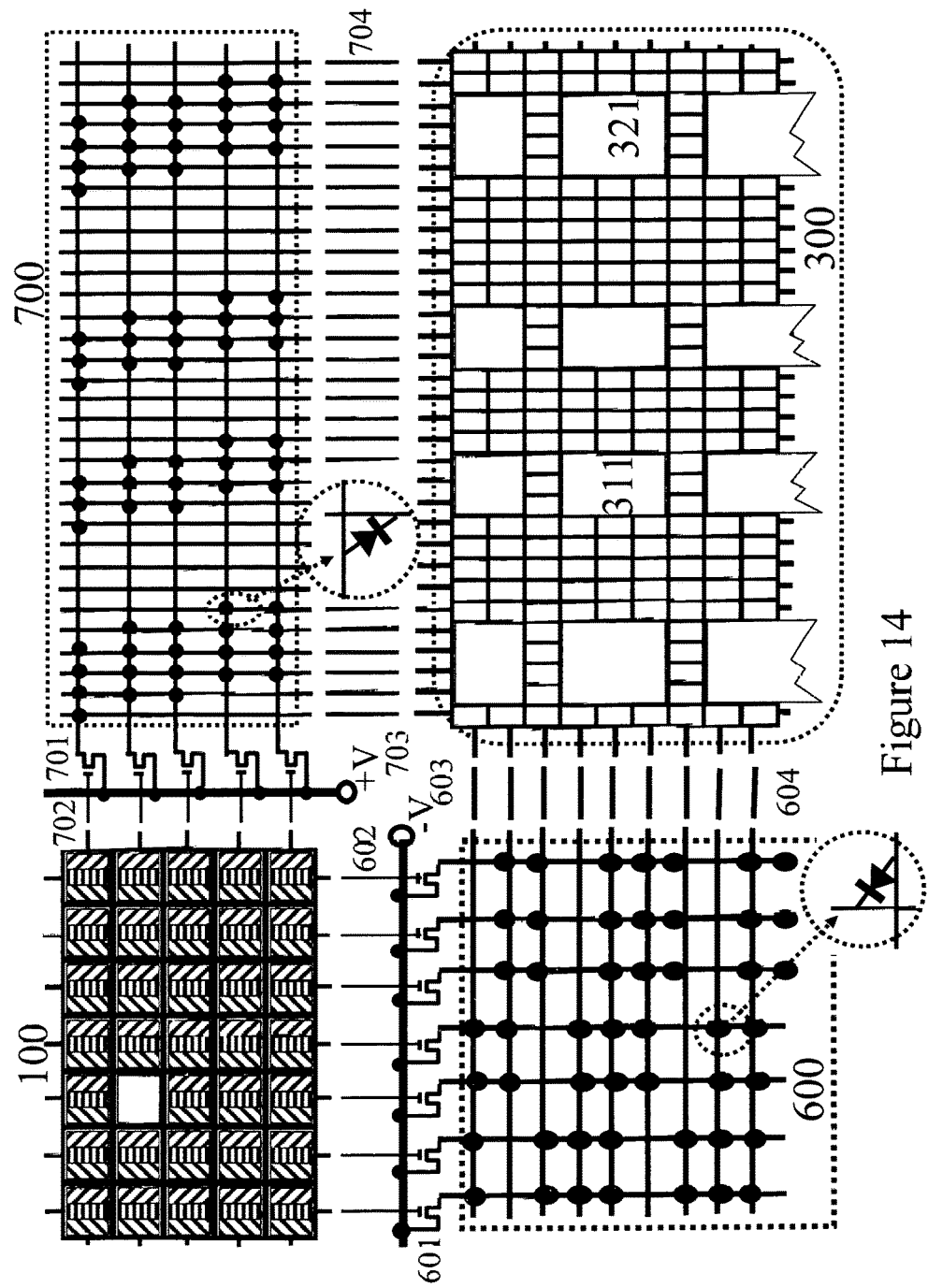
FIG. 14 Shows an example configuration of glasses-less 3D display process and control of this invention, for "dynamic pinhole shutter method", with built-in designs for switch units—address drivers.

FIG. 14 shows an example how built-in address drivers (dipole based circuit) work. Address driver contains two address matrixes, one is row address matrix 600, and the other is column address matrix 700. Address matrix is a metal mesh and some nodes at the mesh crosses has switch unit (such as dipole as shown in FIG. 14, but not limited to this) connected to two metal mesh lines at the cross. A node at a metal line cross with solid circles means there is a connection through a dipole (direction is shown in the chart), a node without solid circles means there is no connection (no dipole) at metal cross. When an image pixel, say at (3, 4) [i.e. row 3 and column 4 3] in top-left-corner (before 90° rotation) for example, is lighting, the triggering signal on column 4 (i.e. 702) triggers the switch 701 for row line 4 in address matrix 700→then all the column lines in 700 with solid circles at crosses with row line 4 will switched on, which leads to all corresponding column wires in shutter screen 300 will switch on→means these column lines on 300 are connected to a voltage source +V 703; meanwhile, the triggering signal on row 3 (i.e. 602) triggers the switch 601 for column line 3 in address matrix 600→then all the row lines with solid circles at crosses with column line 3 will be switched on, which leads all corresponding row wires in shutter screen 300 will switch on→means these row lines on 300 are connected to a voltage source −V (or 0) 603; As a result, all the shutter valve pixels at the crosses (which form a rectangular shutter pupil) of the these rows (with voltage −V) and these columns (with voltage +V) in shutter screen are turned to open (pass light). By this way, for any given image pixel on image pixel screen 100, pupil functions for all right eyes, or all left eyes can be achieved. All the switch units (such as dipole, etc.) mentioned above are pre-built-in by design.

Figure 15:
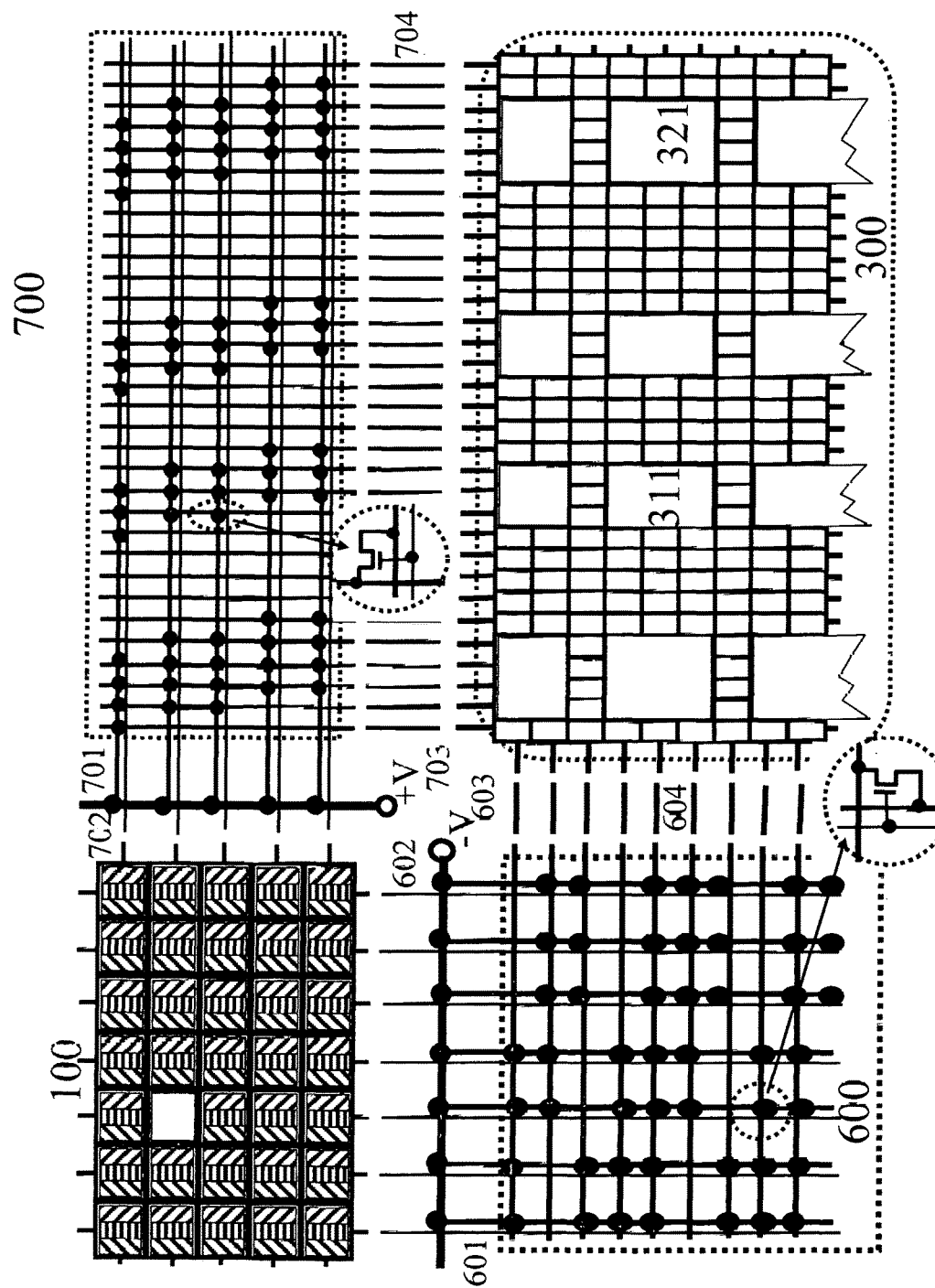

FIG. 15 shows an example of the case with voltage-controlled switches. Similar as in FIG. 14, the nodes with solid circles means there is a connection through voltage-controlled switches (such as transistor, but not limited to this), the nodes without solid circles means there is no connection at metal cross. For this case, the switch is controlled by the voltage signal at 602 or 702. All the voltage-controlled switches are pre-built-in by design.

Figure 16:
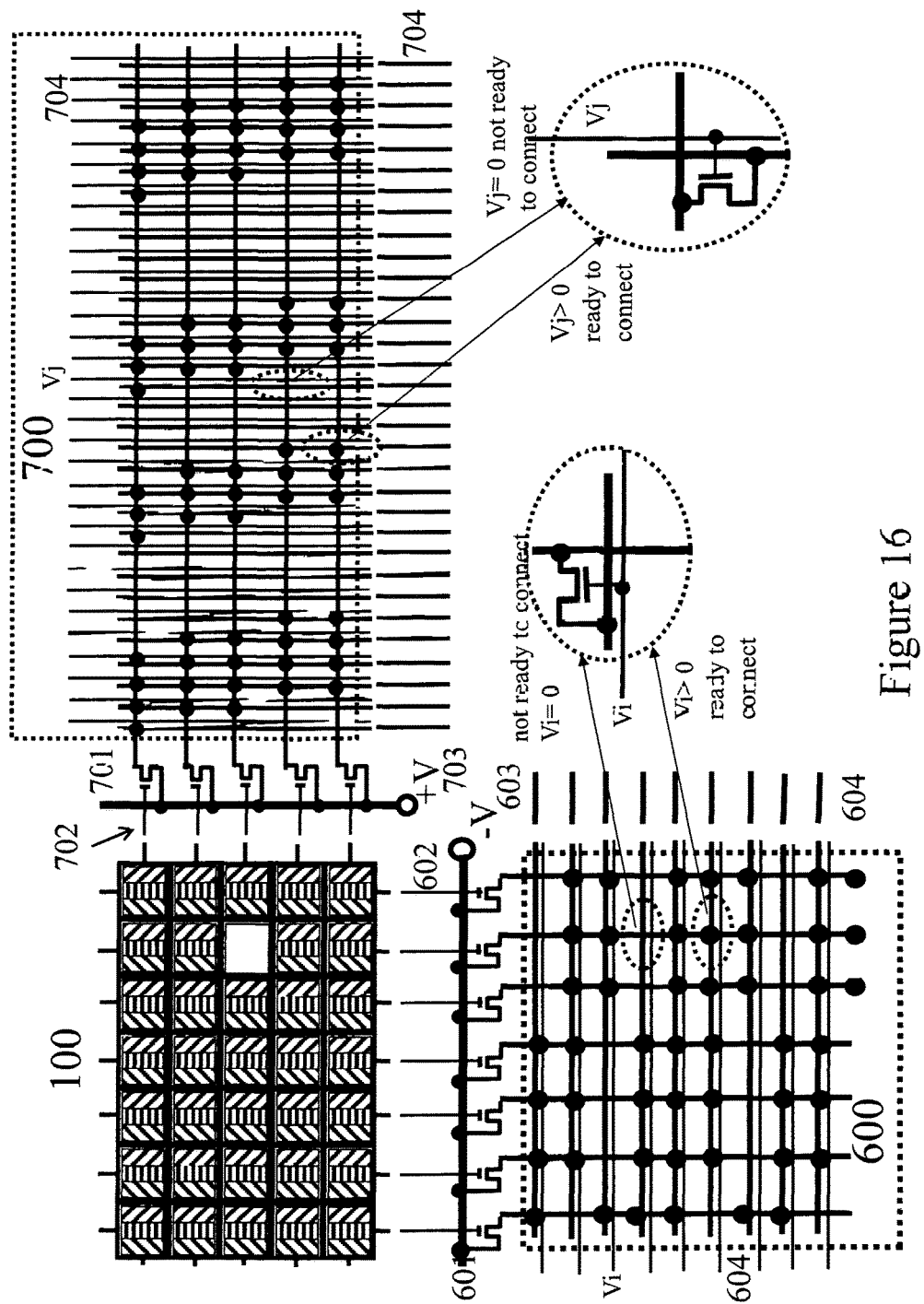
FIG. 16 Shows third example configuration of glasses-less 3D display process and control of this invention, for "dynamic pinhole shutter method", with dynamic control design for switch units—dynamic address drivers.

As we known, in FIGS. 14 and 15 show two examples of built-in designs for switch units, while in FIG. 16 shows an example of a dynamic control design for switch units. Now each of ALL nodes (whatever has solid circles or not) has voltage-controlled switch. Voltage-controlled switch here is different from that mentioned in FIG. 15. In FIG. 15, the switch units are controlled by voltage signals from 602 or 702, but in FIG. 16, the switch units are controlled by both voltage signals from (602 or 702) and dynamic control voltages (Vi or Vj). Please note that the symbol definition in figure is changed, The node with solid circle NOW means the voltage-controlled switch at this node is ready for to switch ON, and the node without solid circle NOW means the voltage-controlled switch at this node is NOT ready to switch on. Therefore, "the switch at node being ready or not ready to switch on" can be controlled dynamically by dynamic control voltages Vi and Vj from dynamic control lines, according to the data from eye-tracking camera The eye motion can be easily detected by the using optical image correlation (using FFT) of two images taken by eye-tracking camera at two neighboring moments in time. So, the locations and sizes of shutter pupils on shutter screen for rights and left eyes can be easily determined, and further, the row addresses and column addresses for shutter pixels (valves) in each of these shutter pupils can be calculated and dynamically updated in the address buffers, which provides steady address data streams for row address matrix 600 and the other is column address matrix 700.

To increase the brightness, screen may be divided into multiple zones. Image pixel scan happens in each zone simultaneously, with zone rotation. In this case, the design should be well optimized to avoid the light cross talking. Increasing brightness may also be done by using vertical zone rotation only.

What is claimed is:
1. Glasses-less 3D display method comprises the following steps
   (1) making a lighting screen for displaying the colors and brightness of display pixels;
   (2) making at least one shutter screen at front of said lighting screen with specified separation;
   (3) determining the positions and sizes of shutter pupils on said shutter screens and locations of lighting pixels on said lighting screen based on eye space concept including eye zone locations and eye zone sizes; wherein, in dynamic pinhole shutter method, positions and sizes of shutter pupils for a given display pixel on said lighting screen are determined by locations of corresponding eye zones and said display pixel; wherein, in mimic scene method, concept of the scene depth profile in picture space is used to determine corresponding shining point on said depth profile which virtually diverges rays for an selected image pixel in picture space, and the positions and sizes of shutter pupils on an inner shutter screen and an outer shutter screen and locations of lighting pixels on said lighting screen for a given image pixel in picture space are coordinately determined by locations of corresponding eye zones and said scene depth;

(4) making address drivers with corresponding operation procedures to control all said screens dynamically; wherein, in dynamic pinhole shutter method, address drivers of shutter screen are used to form shutter pupils dynamically, associated with use of operation procedures of dynamic pinhole shutter method for scanning pixels on said lighting screen and for controlling the switching of shutter pupils on said shutter screen; wherein, in mimic scene method, address drivers of shutter screens and address drivers of lighting screen are used to coordinately form shutter pupils and lighting strips dynamically, associated with use of operation procedures of mimic scene method for lighting and scanning pixels on said lighting screen and for controlling shutter pupils on said shutter screens; wherein, said address drivers are specifically pre-built-in matrixes of address driving circuits; and (5) assembling said address drivers with said shutter screens at front of said lighting screen;

wherein, the said method is applicable to any 3D display, including TV's, monitors, smart devices, movie theaters, and games, with full capacity of TV viewers for given space, and with flexibility for eye and head motions.

2. The method of claim 1, wherein said eye space comprises all possible eyes located within the viewing area from left to right, from bottom to top, and from front to rear; wherein, for each of the eye, there is a corresponding eye zone centered at eye location; wherein each of said eye locations and each of said eye zones has a corresponding projected eye location and projected eye zone respectively on eye-projection plane, so that the projected eye locations have pre-determined separations and the projected zones have pre-determined sizes, and said eye-projection plane is at the middle rows of viewers.

3. A display system operated by the processes of method claim 1 comprises
   (1) said lighting screen for displaying the colors and brightness of image pixels;
   (2) said shutter screens at front of lighting screen with specified separation;
   (3) said method for determining the positions and sizes of shutter pupils on said shutter screens and locations of lighting pixels on said lighting screen based on eye space concept;
   (4) said address drivers of shutter screens and address drivers of lighting screen to form shutter pupils and lighting strips dynamically; and
   (5) said operation procedures for controlling all said screens dynamically.

4. A display system operated by the processes of method claim 1 comprises
   (1) said lighting screen for displaying the colors and brightness of image pixels;
   (2) said shutter screen at front of lighting screen with specified separation;
   (3) said method for determining the positions and sizes of shutter pupils on said shutter screens based on eye space concept;
   (4) said address drivers of shutter screen to form shutter pupils dynamically; and
   (5) said operation procedures for controlling said shutter screen dynamically.

* * * * *